Jan. 16, 1945.  A. H. WARTH ET AL  2,367,250
METHOD OF MAKING CAPS
Filed May 2, 1941
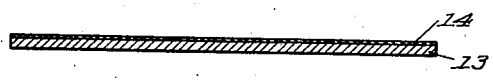
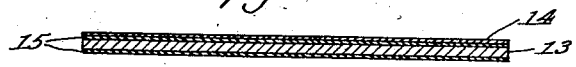
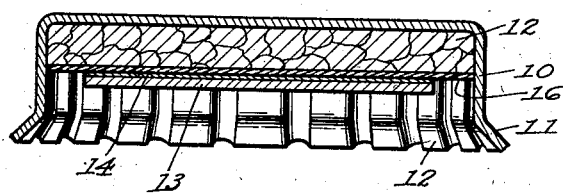
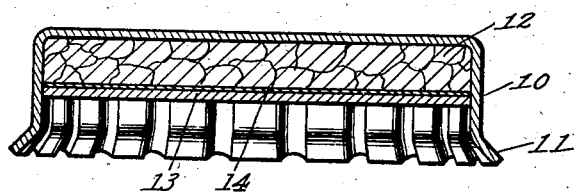
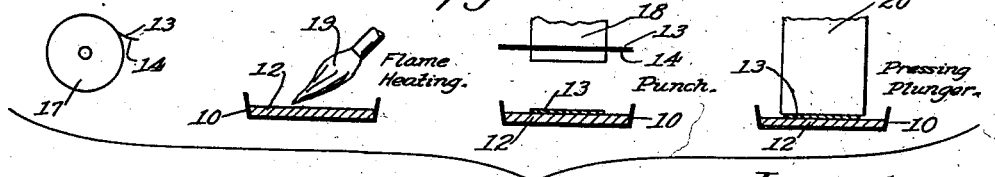
Inventors:
Albin H. Warth,
Edgar Lidard,
By Cushman Darby and Cushman
Attorneys.

Patented Jan. 16, 1945

2,367,250

UNITED STATES PATENT OFFICE 2,367,250

METHOD OF MAKING CAPS

Albin H. Warth and Edgar Lidard, Baltimore, Md., assignors to Crown Cork & Seal Company, Inc., Baltimore, Md., a corporation of New York Application May 2, 1941, Serial No. 391,599

1 Claim. (Cl. 113—80)

This invention relates to a method of making caps and particularly center spot caps which include a metal shell, a cushion liner disposed therein and a facing layer of resistant material united to the cushion liner in centered relation by a stratum of adhesive. The center spot protects the contents of the container from contact with the liner and permits the lip of the container to engage directly the cushion liner and thereby form a tight seal. In addition to the usual spots and overall facings of paper and metal foil, such as aluminum, caps in accordance with this invention are formed with spots and overall facings from two sides varnished paper and two sides varnished foil, as well as chlorinated rubber and vinyl resin. Two sides varnished paper affords a more impermeable facing and allows a thinner paper to be employed while two sides varnished foil enhances the protective and sealing action of the facing. Notwithstanding the adhesive repellent character of the high gloss finish of the varnished surface, the two sides varnished paper or foil spots are permanently adhered to the cushion liner by means of the improved adhesive of the present invention. Furthermore, the invention includes the use of cushion liners having a waxed surface which, like two sides varnished paper or foil, has been regarded as adhesive repellent and hence unsuitable for spot caps. Of equal importance, spots having adhesive repellent surfaces, such as two sides coated paper or foil, are with similar reliability adhered to such waxed surfaces.

Also, the invention employs new strip spotting laminated materials comprising (1) a facing of the character above described and (2) an adhesive coat suitable for use in automatic spotting machinery. This strip may be spooled and stored for this purpose without danger of the convolutions adhering in the spool or the necessity for maintaining the spooled material under refrigerated conditions. In other words, under normal temperature and pressure conditions, offsetting, i. e., adhering of the convolutions of the spool during storage occasioned by a lack of heat and pressure stability of the adhesive coating is precluded by the material employed in the method of this invention, and the strip freely unwinds when acted on by the feeding mechanism of the cap spotting apparatus. Refrigeration of the spool during storage is unnecessary. Moreover, peeling or separating of the adhesive from the backing does not occur under the severe condition of being associated with high gloss or generally considered adhesive repellent surfaces.

The invention further includes a new method of spotting which is more rapid and economical than present practice, and enables more comfortable conditions to be established for the operators of the spotting machinery. The new method embodies preheating the cushion discs, punching out a spot and centering the same in adhered relation upon the cushion liner under simultaneously applied heat and impact pressure upon the cushion liner, and then subjecting the assembly to mechanical pressure. The pressure may be accompanied by heat, if desired, but we prefer a mild heat such as heat below 160° F. The use of a single heating step and a single pressure step constitute a marked improvement, in that (1) the punch and presser plunger are cold, i. e., unheated and at atmospheric temperature, although the latter may for some purposes be slightly warmed and (2) post heaters and pressure dials conventionally employed after the pressing step no longer are necessary. Moreover, the elimination of additional heating steps enables such advantageous materials as vinyl resin or chlorinated rubber, which are damaged by heat, to be successfully used as spotting materials.

In addition, the invention provides a method using a new permanently thermoplastic and stable adhesive having a high softening or tacking point which particularly allows materials and coated liners, heretofore regarded as adhesive repellent and, therefore, unsatisfactory for making spot caps, to be successfully used for cap spotting and liner purposes. The adhesive composition consists of a resin, wax, and rubber, prepared as a solution in an organic solvent and spread upon the spotting material or backing and dried as a continuous film. This adhesive composition has the very important property of increasing adhesion of the adhesive surface on aging, i. e., the adhesive increases in adhesive strength at a measurable rate from week to week. Moreover, the adhesive greatly increases its adhesion to the cushion discs when caps are applied to bottles by crowning equipment.

A preferred resin is "Nevillite No. 3," which is described by the Neville Company of Pittsburgh as "Cyclo-paraffin or naphthene polymers" and is a water white resin referred to as a cumarindene resin. It is not adaptable of itself to form a flexible film, but with the rubber or wax, or both, a desired continuous flexible film of adhesive is produced. This adhesive resin is unsaponifiable, permanently thermoplastic, water, alcohol, acid, and alkali resistant, resistant to salts, oxidation resistant, non-toxic, and free from objectionable odor or taste. The resin is resistant to polar solvents, but soluble in hydrocarbon solvents and in most of the solvents for wax and rubber. The resin is also cheap, easy to handle, compatible with mineral oil, paraffin, wax, petrolatum, rubber, "Vistanex" and other resins, such as hydrogenated rosin, rosin, Araclor resins and methacrylate resins which may be mixed with the Nevillite. Particularly, the resin has a high softening point (224° F. to 228° F.) and a high melting point (293° F. to 301° F.), and unlike many other resins, in subdivided form, its microscopic particles do not fuse or coalesce together under normal temperatures or spooling or handling pressure, or upon warming, while the composition is aging, i. e., in storage, so as to become tacky and thereby produce offsetting of the rolled spot material. The various properties outlined make the resin an ideal component of the adhesive, particularly its high softening point which assists in maintaining the composition permanently thermoplastic and stable on the one hand, while affording optimum adhesiveness under heat on the other. In this connection, the high softening and melting point of the resin assists in preventing offsetting of the adhesive composition to bind the convolutions of the spool of the strip spotting material under normal temperature and pressure conditions and when stored prior to use, and prevents decomposition by heat during the spot assembly operation.

The wax employed has a high melting point, e. g., about 185° F. It is freely soluble in the hydrocarbon solvent when warm, but after coating and drying, precipitates on cooling to normal room temperature and is compatible with the high softening point resin and rubber. When the adhesive composition is dried, the wax aids formation of the film and tends to bloom out on the film surface. The wax is of an amorphous or micro-crystalline paraffinic character containing its natural oils, which increases adhesiveness. Moreover, the wax has optimum adhesiveness when warm, a higher tenacity than lower melting point waxes, and by having a high melting point, raises the melting point of the composition. This wax very substantially aids in eliminating offsetting of the adhesive on the spooled strip spotting material.

The rubber has the function of a film forming constituent, and the use of reclaim rubber affords a softer and more adhesive composition and acts as a carrier for the resin and the wax. It assists in producing a heterogeneous composition of the crepe rubber and the other constituents.

A suitable exemplary adhesive composition contains substantially the following:

| | |
|---|---|
| Crepe rubber _____ grams__ | 350 |
| Ivorylite (reclaim) _____ do___ | 75 |
| Pale yellow (petrolatum) wax, 185° M. P. _____ do___ | 75 |
| #3 Nevillite resin _____ do___ | 1165 |
| "Rubber-sol" (end point, 245–265° F.) _____ quarts__ | 8 |

Instead of "Rubber-sol," we some times use "Benzo-sol," about eight quarts, and varnoline, about one quart.

This composition is formed by breaking down the crepe rubber in a mill and then milling in the reclaim rubber; the wax is then milled in and greatly aids the rubber to dissolve in the solvent. The above mass is dissolved in about four quarts of "Rubber-sol," which is a hydrocarbon, non-polar solvent, and the resin is also dissolved in four quarts of "Rubber-sol." The two solutions are added together and mixed to produce about two and one-half gallons.

While we prefer a "Nevillite resin," such as No. 3, Nevillite No. 1 and No. 2 may be instead employed, differing from No. 3 only in color, as well as other non-oxidizable resins, such as hydrogenated rosin, "Galax" (which is prepared from rosin), "Araclor" resins, "Piccolyte" resins, particularly the "W" grade (The Pennsylvania Industrial Chemical Corporation), and methacrylate (Du Pont) resins, having properties substantially similar to Nevillite. The latter mentioned resins, however, do not compare favorably in properties with a "Nevillite" resin, and although they may be used with the latter, they are not required. They are, however, compatible with rubber and wax.

The pale yellow wax referred to in the above example is an adhesive wax of high melting point and is regarded as amorphous or micro-crystalline paraffin. This "yellow wax" may also be defined as "petrolatum wax," being one of the amorphous or micro-crystalline paraffin waxes produced by several of the oil refining companies from oil residuums. Other waxes may be used providing they have the desired adhesive, high melting point, and other characteristics recited.

Instead of a mixture of reclaim and crepe rubber, we may use "Vistanex," although it is not preferred except in admixture with the crepe and reclaim rubber or as a substitute for one or the other. "Vistanex" is compatible with both "Nevillite" resin and wax, and requires no particular change in solvent. Pará rubber, smoked sheet, and other rubber or rubber-like materials may be used where odor, taste, and impurities are not objectionable.

The solution formed as described is coated upon the spotting material of paper, foil, chlorinated rubber, polyvinyl acetal resin, and vinyl resin, or to the under-surface of a facing of paper or other flexible material having an exposed surface film of such rubber or resin, being applied like a varnish with a coating roll as is the practice with other adhesives. The coating is applied in sufficient quantity to give a dried continuous film thickness of about .0002" to .0003" on the material. This thin coating is advantageous, in that it allows the spot to be substantially flush with the surface of the liner. The material is dried at a temperature of about 175° F. to 200° F. and can be coated and dried at the rate of 125 feet or more per minute in an oven 80 feet long, although the length of the oven may be changed with design. When the spot material is coated as just described, it is wound up into tight rolls which are slit to the proper width for the spools which are to be attached to the spot crown assembly machine. It is extremely important that there be no offsetting of the thermoplastic adhesive, for if such occurs, the material cannot be freely unwound. As explained above, the type of wax and resin employed contributes substantially to eliminate offsetting and particularly the wax acts to preclude this objectionable effect. In fact, when the adhesive is drying, the wax tends to bloom out in the film.

At about 160° F. the adhesive or cement film becomes tacky under pressure of the punch, and the cement increases in tackiness up to about 170° F. In spot machine operations, the heat is applied to the adhesive preferably at the instant of assembly of the spot with the cushion disc, and the source of heat is preferably the cushion disc which may be preheated upward from 160° F. The cement melts down completely only at a temperature much higher than that required to make it very tacky; such melting or free fluidity temperature approximating about 235 to 240° F. The adhesive composition is a heterogeneous mixture which will start to soften slightly above substantially 170° F., e. g., at 172° F. and become more and more fluid up to about 240° F. At 172° F., the slightly softened, but still somewhat tacky adhesive will form a strong union if the adhesive is cooled or only partially cooled during application of pressure. The tacking point of substantially 170° F. is the beginning of the softening point, and as the cement continues to become more and more soft up to the melting point of 235° F., it may be stated that the tacking range is between 160° F. and above substantially 170° F., e. g., 172°, and the softening range between above substantially 170° F. and 235° F. When coated upon the spotting material, the tacking temperature is somewhat reduced upon application of positive pressure as, for example, when the punch plunger deposits the spot upon the heated cork composition or other liner. This pressure responsiveness is likewise present when the pressure plunger engages the spot, after it has been positioned, to permanently adhere it to the liner. Under normal temperatures, however, the adhesive or cement does not fuse or become tacky, and likewise under pressures present in the spool or occasioned by handling, there is no offsetting tendency. This is important, as explained heretofore, in allowing the strip material to be freely unwound from the spool at all times and in no longer requiring that the strip material be refrigerated during storage, particularly where the temperature within the plant is high, or in the summer time. The hardened adhesive composition forms a permanent stable union between the spot and the cushion liner which is not affected by temperature changes, such as are present under sterilizing and pasteurizing conditions to which the sealed container may be subjected. In this connection, while sterilization temperatures of 212° F. may soften the adhesive composition, it does not flow, and the union between the facing and liner is not impaired. The composition hardens as soon as cooling takes place and again exerts its maximum adhesive effect.

Referring to the accompanying drawing:

Figure 1 is a sectional view of a metal foil, paper, chlorinated rubber, vinyl resin, or other laminated material forming the spot facing provided with an adhesive coating before it is adhered to the cushion liner;

Figure 1a is a similar view showing a two sides varnished spot or overall facing material;

Figure 2 is a sectional view showing a center spot adhered to a cushion liner of cork composition having a wax coating;

Figure 3 is a sectional view showing an overall facing adhered to a cushion liner of cork composition; and Figure 4 is a diagrammatic view showing the method of applying spots to caps in accordance with this invention.

Referring to Figures 2 and 3, the cap comprises a metal shell 10 illustrated in the present case as a crown cap having the usual crimped skirt 11, but the invention is equally applicable with all types of caps. Disposed within the shell is a cushion liner 12 of composition cork to which the spot or overall facing 13 of paper, metal foil, such as aluminum foil, chlorinated rubber, vinyl resin, or other suitable material is adhered by a stratum of adhesive 14. While we have shown and described a liner of cork composition, natural cork prepared in accordance with the patent to Mueller, 2,147,987, February 21, 1939, may be employed, as well as liners of paper, rubber, and other materials.

In Figure 1a, we have shown a spot of paper, foil, or other material coated on each side with varnish 15 for use as a facing in accordance with Figures 2 and 3. In Figure 2, the liner surface is coated with a film of wax 16 which in some cases is highly advantageous, to which facings of the character shown in Figures 1, 1a, and 3 may be applied.

Referring to Figure 4, strip spotting material 13—14 is continuously fed from the spool 17 to the punch 18, where a center spot 13 is punched out over the cushion disc 12 and deposited by the punch plunger upon the cushion liner disposed in the shell 10. A plurality of shell cushion assemblies are continuously and progressively fed first to a heating means 19, such as a gas flame, which heats the surfaces of the cushion discs to a temperature of substantially the tacking point or point of maximum adhesiveness of the adhesive. In the present case, the tacking point of the cement composition 14 is between substantially 160° F. and above substantially 170° F., i. e., it forms a strong union at 172° F. as above described. A temperature of about 160° F. to above substantially 170° F., e. g., 172° F. may be considered the average tacking point for cap spotting purposes, in view of the pressure which in the next continuous and progressive operation is imparted when the punch plunger 18 severs and deposits a spot in centered relation upon the heated cushion liner. The adhesive composition is a heterogeneous mixture which at ordinary atmospheric pressure will soften slightly at above 170° F. and continue to soften at increasing temperatures. Under applied pressure the adhesive composition becomes tacky and adhesive at a temperature somewhat below its softening point so that if the adhesive is somewhat softened it will form a strong union if the adhesive is cooled or partially cooled during application of pressure. The punch plunger 18 is at atmospheric temperature, i. e., cool. The tackiness of the thermoplastic adhesive produced by contact with the heated surface of the cushion liner causes the spot to be initially and strongly attached to the cushion liner, whereupon for the third operation, each assembly is continuously progressively passed to a pressing plunger 20 which impacts upon the spot and permanently unites the same to the liner. The pressure plunger exerts sufficient pressure or impact to assure that the warmed adhesive will have its maximum adhesiveness notwithstanding the surface of the cushion, may have cooled slightly, by reason of its travel from the heating means 19. The plunger 20 is cool, i. e., at atmospheric temperature, but on occasion may be warmed. It will be noted that the method of forming spot caps embodies only three spotting steps, namely, heating the cushion liner, depositing the spot thereon with heat and pressure, and then permanently pressing the spot upon the cushion liner. After the caps leave the press, the adhesive hardens at normal temperatures and the use of further heating or pressure steps is unnecessary.

This application is a continuation-in-part of our copending application Serial No. 346,846, filed July 22, 1940.

We claim:

The method of center spotting cushion disks in caps which consists of feeding continuously from a spool of strip spotting material a strip coated with a thermoplastic and pressure sensitive adhesive comprising resin, wax and rubber which under normal temperature and spooling pressure does not fuse or become tacky, punching a center spot from said strip over a cushion liner in the cap with the thermoplastic material interposed between the spot material and the cushion liner, depositing the spot upon the cushion liner in the cap centrally thereof while simultaneously applying heat and pressure to the spot to render the adhesive soft and tacky at a temperature materially below its tacking temperature and to unite the spot to the liner, in immediate succession applying impact pressure over the entire spot area for permanently securing the spot in place while the adhesive is soft and tacky, and finally relieving the cap from heat and pressure under existing temperature conditions to harden the adhesive.

ALBIN H. WARTH.
EDGAR LIDARD.